United States Patent
Zillich

(10) Patent No.: US 10,879,549 B2
(45) Date of Patent: Dec. 29, 2020

(54) BIPOLAR PLATE AND MEMBRANE ELECTRODE UNIT FOR A FUEL CELL ARRANGED IN A FUEL CELL STACK, FUEL CELL AND FUEL CELL STACK

(71) Applicants: VOLKSWAGEN AG, Wolfsburg (DE); AUDI AG, Ingolstadt (DE)

(72) Inventor: Christian Martin Zillich, Öhringen (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 275 days.

(21) Appl. No.: 15/748,602

(22) PCT Filed: Jul. 21, 2016

(86) PCT No.: PCT/EP2016/067423
§ 371 (c)(1),
(2) Date: Jan. 29, 2018

(87) PCT Pub. No.: WO2017/016976
PCT Pub. Date: Feb. 2, 2017

(65) Prior Publication Data
US 2018/0366752 A1    Dec. 20, 2018

(30) Foreign Application Priority Data

Jul. 30, 2015   (DE) .................. 10 2015 214 517

(51) Int. Cl.
*H01M 8/02* (2016.01)
*H01M 8/10* (2016.01)
(Continued)

(52) U.S. Cl.
CPC .......... *H01M 8/1004* (2013.01); *H01M 4/86* (2013.01); *H01M 8/0228* (2013.01);
(Continued)

(58) Field of Classification Search
CPC .... H01M 4/86; H01M 8/0228; H01M 8/0247; H01M 8/0258; H01M 8/0267; H01M 8/1004
See application file for complete search history.

(56) References Cited

U.S. PATENT DOCUMENTS

| 6,974,648 B2 | 12/2005 | Goebel |
| 7,601,452 B2 | 10/2009 | Goebel |
| 2006/0127742 A1 | 6/2006 | Thompson et al. |

FOREIGN PATENT DOCUMENTS

| CN | 101133506 A | 2/2008 |
| CN | 104051772 A | 9/2014 |

(Continued)

*Primary Examiner* — Brittany L Raymond
(74) *Attorney, Agent, or Firm* — Seed Intellectual Property Law Group LLP

(57) ABSTRACT

The invention relates to a bipolar plate (1) for a fuel cell (100) comprising a profiled anode plate (7) and a profiled cathode plate (8), each having an active region (6) as well as two distributor regions (2) for supply and discharge of operating media to or from the active region (6), wherein the distributor regions (2) each have
one main anode gas port (3) for supply and discharge of fuel,
one main cathode gas port (4) for supply and discharge of oxidizer, which is arranged in such a manner that cathode channels (41) extending therefrom run straight, at least across the distributor region (2) of the bipolar plate (1), and have a flow direction that corresponds to a main flow direction in the cathode channels (41) in the active region, as well as a main coolant port (5) for the supply and discharge of coolant.
It is provided according to the invention that the main coolant port (5) and the main anode gas port (3) are adjacent to one another, adjacent to the main cathode gas port (4), and are arranged out of alignment with the active region.

14 Claims, 4 Drawing Sheets

Figure 1:
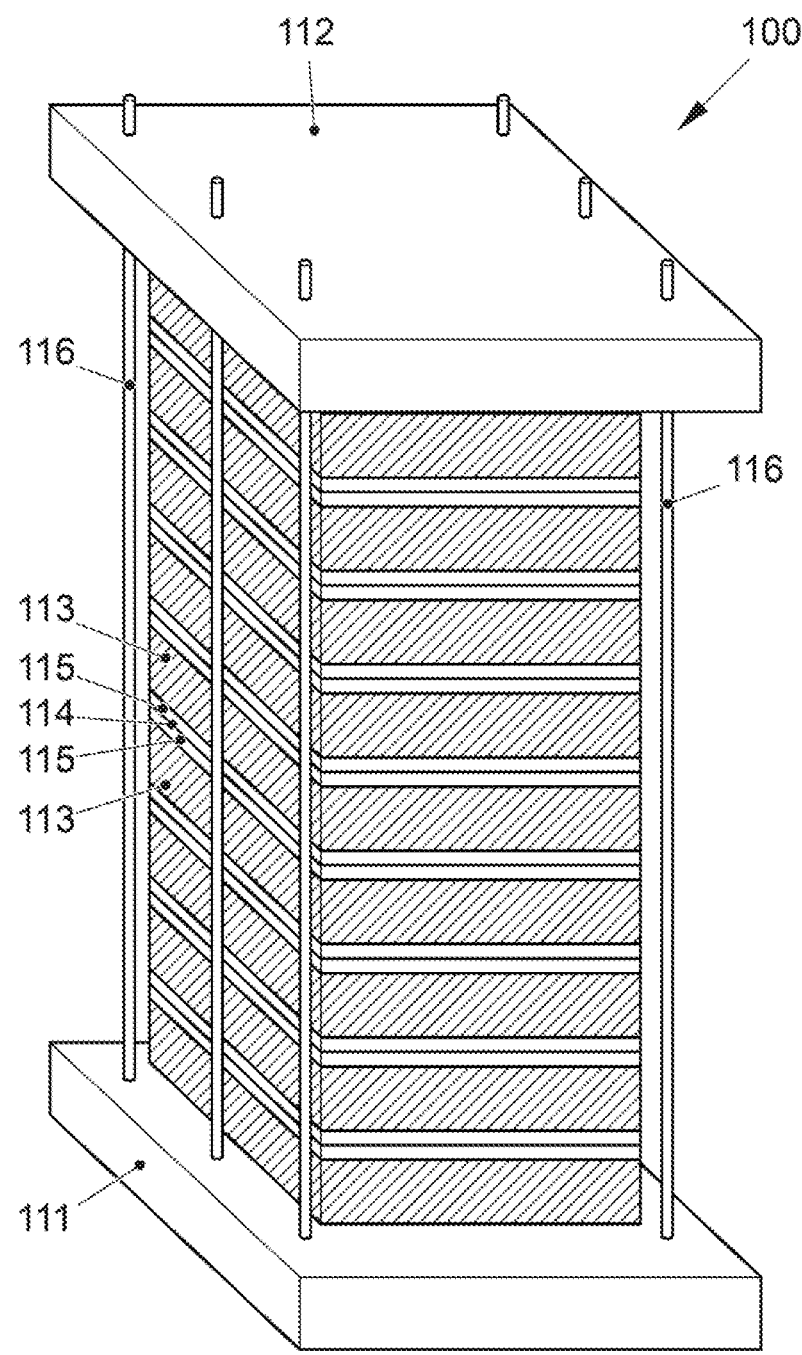

(51) Int. Cl.
  *H01M 4/86* (2006.01)
  *H01M 8/1004* (2016.01)
  *H01M 8/0247* (2016.01)
  *H01M 8/0258* (2016.01)
  *H01M 8/0267* (2016.01)
  *H01M 8/0228* (2016.01)

(52) U.S. Cl.
  CPC ....... *H01M 8/0247* (2013.01); *H01M 8/0258* (2013.01); *H01M 8/0267* (2013.01)

(56) References Cited

FOREIGN PATENT DOCUMENTS

| | | |
|---|---|---|
| DE | 10 2010 048 761 A1 | 4/2012 |
| DE | 10 2013 021 577 A1 | 6/2015 |
| JP | 2006-331655 A | 12/2006 |
| JP | 2008-034251 A | 2/2008 |
| WO | 03/050905 A2 | 6/2003 |

BIPOLAR PLATE AND MEMBRANE ELECTRODE UNIT FOR A FUEL CELL ARRANGED IN A FUEL CELL STACK, FUEL CELL AND FUEL CELL STACK

The invention relates to a bipolar plate for a fuel cell comprising a profiled anode plate and a profiled cathode plate, each having an active region as well as two distributor regions for supply and discharge of operating media to or from the active region, wherein the distributor regions each have an main anode gas port for supply and discharge of fuel a main cathode gas port for supply and discharge of an oxidant, which main cathode gas port is arranged in such a manner that cathode channels exiting therefrom run straight at least across the distributor region of the bipolar plate and have a flow direction that corresponds to a main flow direction in the cathode channels in the active region. The distributor regions further comprise a main coolant port for supply and discharge of coolant, wherein the plates are formed and are arranged over one another in such a manner that the bipolar plate has channels for the operating media that connect the main operating medium ports of both distributor regions, and wherein the distributor regions have a first overlap section in which cathode channels and anode channels overlap each other in a non-fluid communicating manner, and have a second overlapping section in which anode channels and coolant channels overlap each other in a non-fluid communicating manner. The invention further relates to a membrane electrode assembly having a quadrilateral shape, as well as a fuel cell having the bipolar plate and the membrane electrode assembly.

Fuel cells use the chemical conversion of a fuel with oxygen into water in order to generate electrical energy. For this purpose, fuel cells contain as a core component what is known as the membrane electrode assembly (MEA), which is a combination of a proton-conducting membrane and electrodes (anode and cathode) respectively arranged on both sides of the membrane. During operation of the fuel cell, the fuel, in particular hydrogen $H_2$ or a gas mixture containing hydrogen, is guided to the anode, where an electrochemical oxidation with release of electrons takes place ($H_2 \rightarrow 2H^+ 2\ e^-$). Via the membrane, which separates the reaction chambers gas-tightly from one another and electrically insulates them, the protons $H^+$ are transported from the anode chamber into the cathode chamber (in a water-bound or water-free manner). The electrons provided at the anode are guided to the cathode via an electrical line. The cathode is supplied with oxygen or a gas mixture containing oxygen so that a reduction of the oxygen with absorption of the electrons takes place ($\frac{1}{2}O_2 + 2\ e^- \rightarrow O^{2-}$). At the same time, in the cathode chamber these oxygen anions react with the protons transported across the membrane to form water ($2H^+ + O^{2-} \rightarrow H_2O$). As a result of the direct conversion of chemical energy into electrical energy, fuel cells have improved efficiency compared to other electricity generators because the Carnot factor is avoided. Among other things, because of a lower diffusion speed of oxygen compared to hydrogen, the cathode reaction represents the speed-limiting element of the fuel-cell reaction.

Generally, the fuel cell is formed by a plurality of membrane electrode assemblies arranged in the stack, the electrical power outputs of which add up. Arranged between each two membrane electrode assemblies of a fuel cell stack is a bipolar plate, which on the one hand serves to supply the process gases to the anode or cathode of the adjacent membrane electrode assemblies and has coolant channels to dissipate heat. Bipolar plates are also made of an electrically conductive material in order to establish the electrical connection. They thus provide the three-fold function of process gas supply for the membrane electrode assemblies, cooling, and the electrical connection.

Bipolar plates in different designs are known. Weight reduction, reduction of installation space, and increase of power density represent basic goals in the design of bipolar plates. These criteria are important in particular for the mobile use of fuel cells, for example for the electric motor traction of vehicles.

US 2005/0058864 A1 (U.S. Pat. No. 6,974,648 B2) and US 2006/0029840 A1 (U.S. Pat. No. 7,601,452 B2) describe bipolar plates for fuel cells that are constructed from two corrugated and interleaved plates. Each of the plates has a meandering profile so that troughs that are bordered by wall-like elevations are formed on both sides. The two plates thus have different widths of the troughs or elevations that are formed. Closed channels that serve as cooling channels are formed within the nested structure of the plates. In the assembled fuel cell stack, the open channels (troughs) present on the two sides of the structure face each other on the one side of the anode and on the other side of the cathode of the adjacent MEA and serve for their supply with air/oxygen or fuel/hydrogen.

The bipolar plate shown in WO 03/050905 A2 has, on the one side, continuous recesses for the formation of anode channels and, on the other side, continuous recesses for the formation of cathode channels. The plate also possesses closed coolant channels. All channels run parallel to each other.

The invention is now based on the object of providing a fuel cell that is distinguished by a compact shape and increased power density.

This object is achieved by the provision of a bipolar plate and a membrane electrode assembly with the features of the independent claims, as well as by a fuel cell having these components.

A first aspect of the invention thus relates to a bipolar plate for a fuel cell comprising a profiled anode plate and a profiled cathode plate, each comprising an active region as well as two distributor regions for supply and discharge of operating media to or from the active region, wherein the distributor regions each have an main anode gas port for supply and discharge of fuel, a main cathode gas port for supply and discharge of oxidant, and a main coolant port for supply and discharge of coolant. The main cathode gas port here is arranged in such a manner that cathode channels exiting therefrom run straight, at least across the distributor region of the bipolar plate, and have a flow direction that corresponds to a main flow direction in the cathode channels in the active region. The plates are further formed and arranged over one another so that the bipolar plate has channels for the operating media that connect the main operating medium ports of both distributor regions, wherein the distributor regions have a first overlap section in which cathode channels and anode channels overlap each other in a non-fluid communicating manner, and a second overlapping section in which anode channels and coolant channels overlap each other in a non-fluid communicating manner. According to the invention, it is provided that the main coolant port and the main anode gas port are adjacent to each other and are arranged out of alignment with the active region.

The advantage of the bipolar plate according to the invention is in particular an increased power density. This is achieved in that, because of the arrangement of the main port in the distributor region, this has a larger region in which the cathode channels and the anode channels overlap. This region is advantageously already used for the fuel cell reaction, and thus for energy creation. Inactive regions in the distributor region are reduced.

Moreover, the bipolar plate according to the invention has a very compact shape. Instead of the known double-T shape having two legs per distributor region, the bipolar plate according to the invention advantageously has a double-L shape and thus only one leg per distributor region. The length of the supplying flow channels in the distributor region can also be reduced because of the arrangement of the main port.

A fuel cell having a bipolar plate according to the invention can thus generate the same fuel cell performance with a smaller cell surface as a fuel cell having a bipolar plate according to the prior art.

Ports are to be understood as openings present in the bipolar plate that result in channels in a fuel cell stack for guiding operating media.

A bipolar plate according to the invention furthermore has the advantage that, because of the straightness of the cathode channels, a water discharge is facilitated, thereby mostly or completely suppressing a blockage of cathode channels as a result of water accumulation. The overlap of anode and cathode channels according to the invention further leads to an essentially homogeneous distribution of fuel and coolant across the overlap section. This, in turn, promotes a homogeneous distribution of the pressure from reactant fluids (because these are present particularly in gaseous form, they are also indicated as reactant gases in the following) inside the cathode channels across the entire area of the bipolar plate.

Channels are to be understood as open (meaning trough-shaped) and/or closed (meaning tube-shaped) fluid connections for transport of the operating media. They can be designed as a discrete channel and/or as a flux field or flow field that allows a cross-flow. In the first overlap section, the cathode and anode channels are advantageously arranged in discrete channels and parallel to each other. In addition, the cathode channels in the first overlap section are preferably arranged at an angle to each other in the range from 0° to 70°, more preferably in the range from 10° to 50°.

In this case, a bipolar plate is subdivided into three regions, comprising two distributor regions and one active region. A first distributor region thereby serves for the supply of operating media to the active region of the bipolar plate; a second distributor region serves for the discharge of the operating media from the active region. Preferably, the two distributor regions are of the same design and, in particular, can be interchanged because of rotational symmetry. The operating media ports, meaning main anode gas port, main coolant port and main cathode gas port, are in turn arranged in the distributor regions. Preferably, they are arranged inside of one distributor region of the main cathode gas port and of either the main coolant gas port or the main anode gas port, along a first side edge of the bipolar plate. Furthermore, they are preferably arranged inside a distributor region of the main coolant gas port and of the main anode gas port, along a second side edge adjacent to the first side edge. The first side edge here is preferably arranged at a right angle to the extension direction of the active region.

The main operating media ports can generally be classified in terms of their design, in particular their size proportions. In the prior art as well as in the present invention, the main cathode gas port thus always has the largest clear area of the three different main operating media ports; the clear area of the main anode gas port, by contrast, is usually smaller than the areas of the main cathode gas port and the main coolant port. In the present invention, the function of each main operating media port is also clearly identifiable in the passive state.

The active region that is arranged between the two distributor regions is characterized in that this region is opposite an electrode of the membrane electrode assembly in an assembled state of the fuel cell stack. It is delimited by the distributor regions and configured in a mostly rectangular shape. This means that the chemical reactions that are the basis for the energy generation in a fuel cell take place in the active regions.

The operating media are fluids in this case, therefore liquid or gaseous materials that are conducted onto the plate through the respective main operating media ports via appropriate feeds. There are two reactant fluids, in particular one cathode operating medium (oxidant) and one anode operating medium (fuel), as well as a coolant, preferably water. Oxygen is preferably used as the oxidizer and hydrogen as the fuel.

In this case, the cathode channels of a bipolar plate run straight or without deflection, meaning without a change of direction, at least across the distributor region. It is to be understood in this case that the cathode channels have no bends when viewing the cathode plate from above. Preferably, they are arranged parallel to each other. Such an arrangement is present at least in the distributor region. This arrangement is also preferably continued along the whole length of the bipolar plate, meaning also in the active region. The straight run of the cathode channel has the advantage that a collection of water and an accompanying blockage of the cathode channels are prevented by an improvement in the hydraulic cross section in the whole cathode channel region. The bipolar plate according to the invention can further be operated using a low-pressure strategy, meaning an operating media pressure of less than 0.2 MPa (2 bar).

The anode channels are preferably designed in such a manner that they extend over the whole width of a cathode flow field, wherein the cathode flow field corresponds to the sum of all cathode channels. In this manner, it is advantageously achieved that the fuel is supplied to the flow field across the whole width with an essentially uniform initial pressure, whereas in the conventional design of a bipolar plate a non-homogeneous fuel pressure distribution is already created in the distributor region.

An overlap section within the meaning of the invention is a region in a distributor region of the bipolar plate in which at least two types of flow channels, meaning coolant channels, cathode channels and/or anode channels, are superimposed in a non-fluid conveying manner. Angles in the range from 0° to 180° can thus be formed between two respective types of channels. If angles are formed in the range from 0° to 89°, the flow direction of the fluids conducted in the corresponding channels can be seen as essentially the same; by contrast, if the angle formed is in the range from 91° to 180°, the flow direction is essentially opposite.

With particular advantage, anode channels and coolant channels in the first overlap section run parallel to each other and, with the cathode channels, enclose an angle in the range from 10° to 90°, in particular from 20° to 80°, preferably from 25° to 75°, particularly preferably from 35° to 55°.

In a preferred embodiment of the invention, it is preferred that the first overlap section is arranged in the extension direction of the active region, in alignment therewith. This ensures that the cathode channels in the distributor region run straight and also have the same flow direction as in the active region. More preferably, the sum of the width of all of the cathode channels exiting from the main cathode port essentially corresponds to the width of the active region. More preferably, the main coolant gas port and the main anode gas port are arranged out of this alignment, specifically on one side.

Advantageously, the first overlap section has the shape of a triangle, in particular a right triangle. This shape is distinguished by its simplicity. In particular because of this design, the first overlap section is pressurized by the reaction gases from two sides arranged perpendicular to each other, and thus completely and evenly. The first overlap region is thus available for the fuel cell reaction.

This preferred shape of the first overlap section is preferably achieved if at least one of the main operating media ports, in particular the main cathode gas port, has an essentially triangular shape. The main cathode gas port is then advantageously arranged in the distributor region so that one corner, in particular the right angle, is arranged on a side of the distributor region facing away from the second overlap section, wherein the side edge of the triangle that is adjacent to the angle runs along the side edge of the bipolar plate that is arranged perpendicular to the extension direction of the bipolar plate.

It is further preferred that the first overlap section is arranged in such a manner that a first side edge, in particular a cathetus, of the first overlap section runs as an extension of an edge of the active region. The advantage of this design is the optimal use of the available surface. A membrane electrode assembly that is arranged on the bipolar plate results in the advantage that the membrane can be fully coated without regions of the electrode, meaning of the catalytic coating, not being involved in the fuel cell reaction.

It is advantageous if the first overlap section is further arranged in such a manner that a second side edge, in particular a cathetus, of the first overlap region runs along a delimiting border line of the active region. The border line thus runs perpendicular to the extension direction of the active region and delimits this from the distributor region.

The bipolar plate according to the invention further has a second overlap section in the distributor region. Only the anode channels and the coolant channels that intersect at an angle greater than 0°, in particular in the range from 55° to 125°, preferably in the range from 70° to 110°, run within said second overlap section. The second overlap section has no cathode channels and, according to a preferred embodiment, is out of with the active region. This enables a maximum expansion of the first overlap section, as well as a compact shape of the bipolar plate.

In the second overlap section, the anode channels more preferably run in such a manner that a flow direction runs in a direction facing away from one of the active regions. This means that anode gas in this section flows essentially opposite to a flow direction of the cathode gas in the cathode channels inside the first overlap section. In other words, the anode channels in the second overlap section run at an angle in the range from 91° to 180°, in particular in the range from 100° to 170°, relative to the cathode channels in the first overlap section. By contrast, the coolant channels in the second overlap section preferably have an angle in the range from 0° to 90°, in particular in the range from 20° to 80°, relative to the cathode channels inside the first overlap section. In this embodiment, the main coolant port of a distributor region has the largest possible diameter. In addition, the coolant channels are arranged in such a manner that coolant is supplied strongly directed and evenly distributed in the active region, without passing through tight bends in which an accumulation of sediments or ice could occur.

An additional aspect of the present invention relates to a membrane electrode assembly that comprises a membrane which has a quadrilateral shape with two parallel longitudinal sides and two short sides opposing each other, wherein at least one angle enclosed by a short side and an adjacent longitudinal side is different than 90°. The membrane electrode assembly further comprises two electrodes arranged on the two sides of the membrane, wherein the electrode surface has the same shape as the membrane surface. According to the invention, the shape of the electrode surface corresponds to the shape of the membrane surface. In this case, the enclosed angle is always to be understood as the smaller angle enclosed by the short and longitudinal sides, even if this does not correspond to the interior angle of the quadrilateral. The membrane electrode assembly according to the invention is thus designed in such a manner that it can be arranged on the bipolar plate according to the invention.

The electrodes of a fuel cell are typically present as a catalytic coating on the gas diffusion layer; they are then referred to as gas diffusion electrodes. The electrodes can also be present as a catalytic coating on the membrane, however. In this case, they are also referred to catalytically coated membranes or CCM (for catalytically coated membrane). The process of coating a membrane material with a catalytic material and thus to produce the catalyst layers in order to produce a CCM is known in various techniques. Among these are printing methods, spray methods, deposition methods and painting methods. Cost-effective methods with high production rates are desirable for mass production.

In contrast to known membranes, the membrane according to the invention has the advantage that a part of the active region functionally extends into the distributor region of the bipolar plate, and the power density of the membrane electrode assembly is thus increased. The membrane according to the invention is designed in such a manner that the whole membrane is advantageously activated for the production of a membrane electrode assembly, meaning that it is coated with a catalytic material (catalytically coated membrane, CCM). Alternatively, a gas diffusion layer adjacent to the membrane is coated as a whole with a catalytic material at the region adjacent to the membrane, whereby the usable active surface is maximized and the power density of the membrane electrode assembly is increased.

Figure 2:
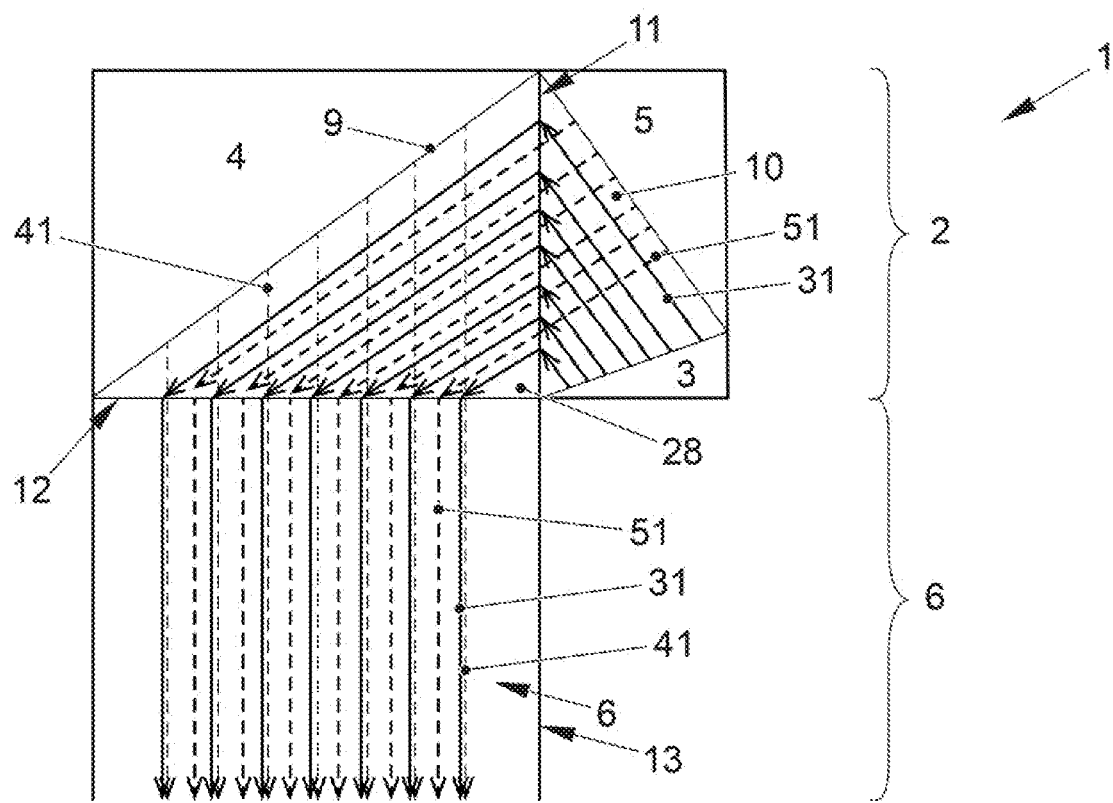

That region of an MEA that is acted upon by the two reactant gases for the anode and cathode in the fuel cell stack, and at which the fuel cell reaction takes place as electricity is generated, is designated as the activated region. The activated region occupies only a part of the total surface of the MEA, however. The remaining regions, which can have a variable shape, serve for the supply and distribution of the operating media to the activated region, and for sealing as well as the mechanical stabilization of the MEA. These regions are designated as non-active or inactive regions. In conventional fuel cells, the activated region has the shape of the active region of the bipolar plate, and thus a mostly rectangular shape. In the effort to achieve a high surface utilization for the activated region, arrangements having non-rectangular activated regions have recently been developed, for example with a regular or irregular hexagonal contour as shown in FIG. 2. For cost reasons, it is always desirable in principle to furnish only the activated region with the catalytic coating. The selective coating of the activated region is possible using printing methods, for example offset or screen printing. However, these methods, at least in the case of screen printing, are comparatively time-consuming or require cost-intensive machinery (offset printing). Continuous coating processes, on the other hand, in which the membrane material is continuously coated with the catalytic material and the catalyst coated membrane is subsequently cut out using an assembly cut, are quicker and less labor-intensive. It is a disadvantage here that, in the case of non-rectangular activated regions, the coating of inactive regions of the membrane or of the membrane intersection is unavoidable. To the extent that inactive areas are adversely coated with catalytic material, these areas must be subsequently blocked, for example, by applying diffusion barrier layers. In any case, the excess coating represents a loss of catalytic material.

In a preferred embodiment, all interior angles of the quadrilateral deviate from 90°. The membrane can thus have the shape of a trapezoid or of a parallelogram. The advantage of this embodiment is that the membrane is individually adapted to the bipolar plate in such a manner that a part of the membrane electrode assembly extends into the distributor region.

Also preferably, the opposing short sides are parallel to each other. The membrane according to the invention in this embodiment thus has the shape of a parallelogram, wherein all opposing angles are of equal size. If the membrane has the shape of a parallelogram, meaning of a regular rectangle, production is simplified relative to irregular geometric shapes.

In addition, the invention relates to a fuel cell that comprises the bipolar plate according to the invention and the membrane electrode assembly according to the invention. The fuel cell according to the invention has an increased power density compared to the prior art.

In addition, the invention relates to a fuel cell stack comprising a plurality of membrane electrode assemblies alternately stacked with bipolar plates according to the invention. The fuel cell stack can particularly be used in an aircraft having an electromotor drive, in which the fuel cell stack is used to supply electricity to the electric motor and/or a traction battery.

Additional preferred embodiments of the invention arise from the remaining features stated in the dependent claims.

The various embodiments of the invention mentioned in this application may be combined advantageously with one another unless stated otherwise in individual cases.

Figure 3:
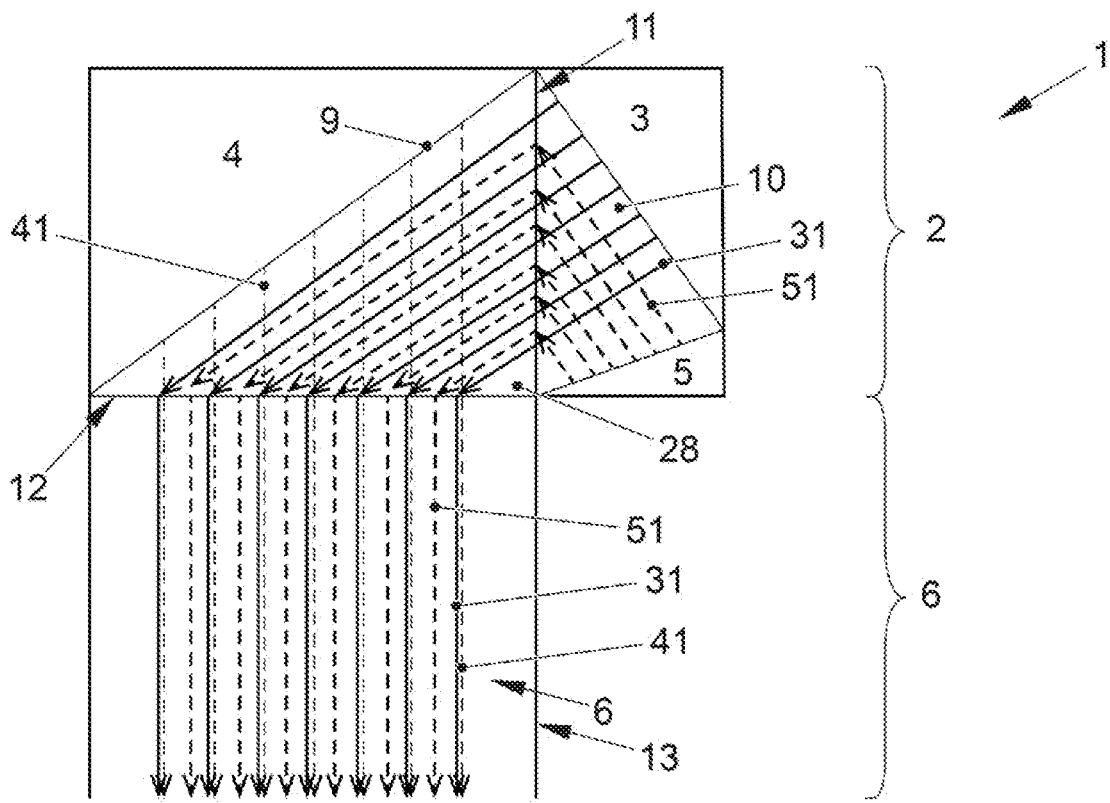
Figure 4A:
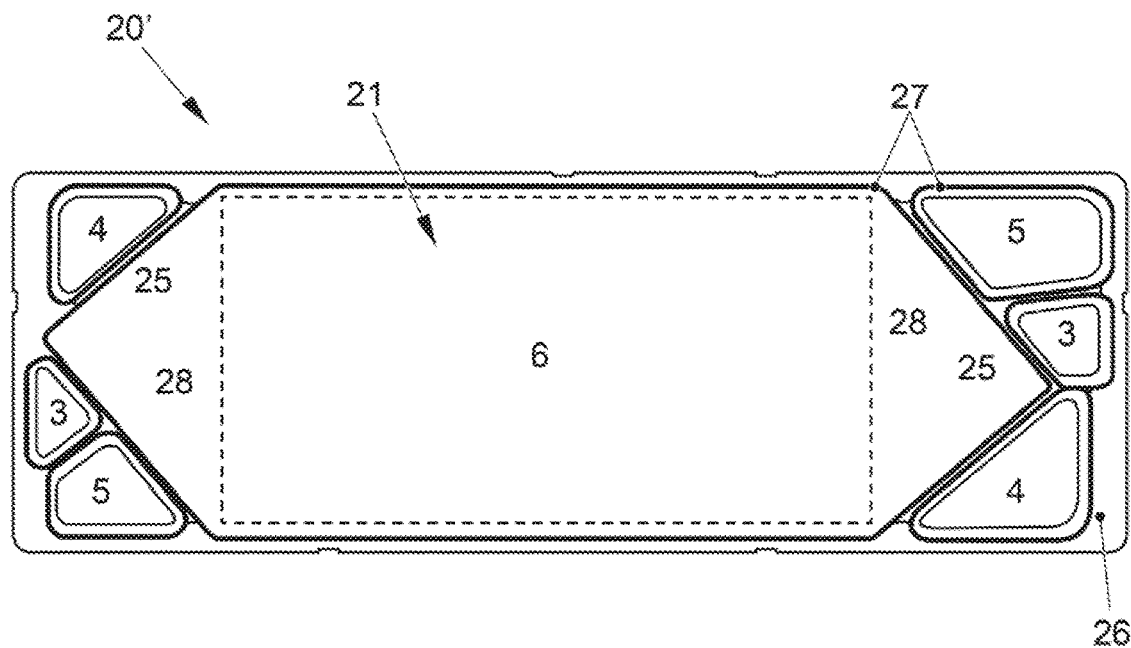

The invention is explained below in exemplary embodiments in reference to the respective drawings. The following is shown:

FIG. 1 a schematic representation of a fuel cell stack,

FIG. 2 a schematic concept sketch of a section of a bipolar plate in a first embodiment of the invention, in top view, FIG. 3 a schematic concept sketch of a section of a bipolar plate in an additional embodiment of the invention, in top view, FIG. 4A a schematic representation of a membrane electrode assembly according to the prior art.

Figure 4B:
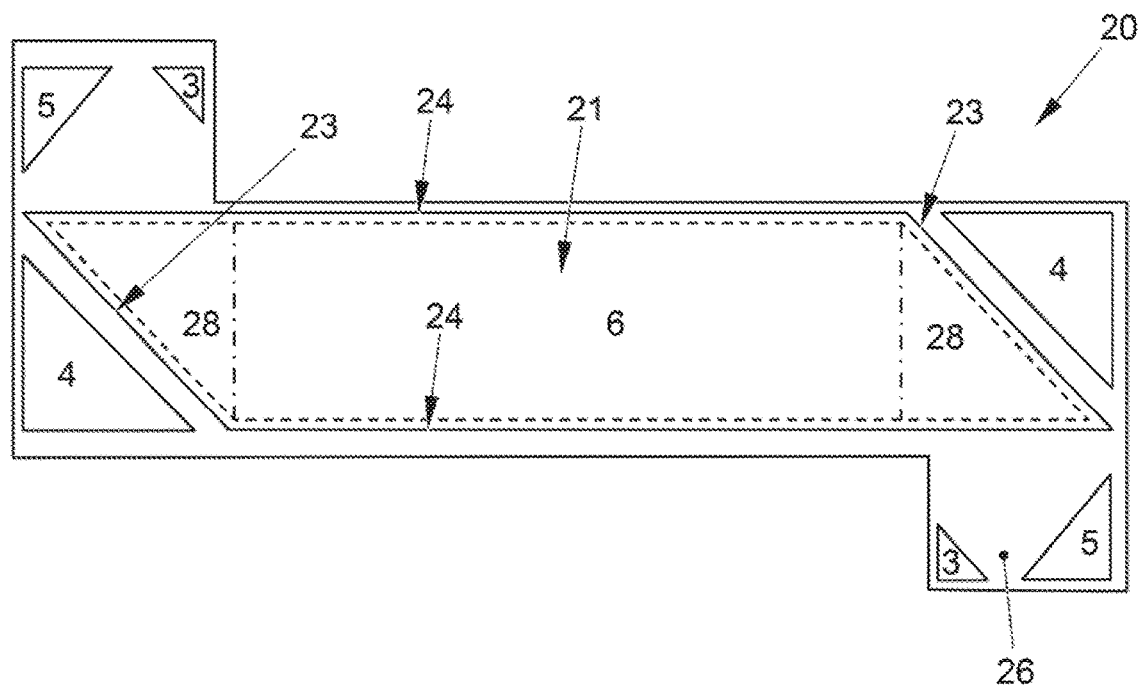
Figure 5:
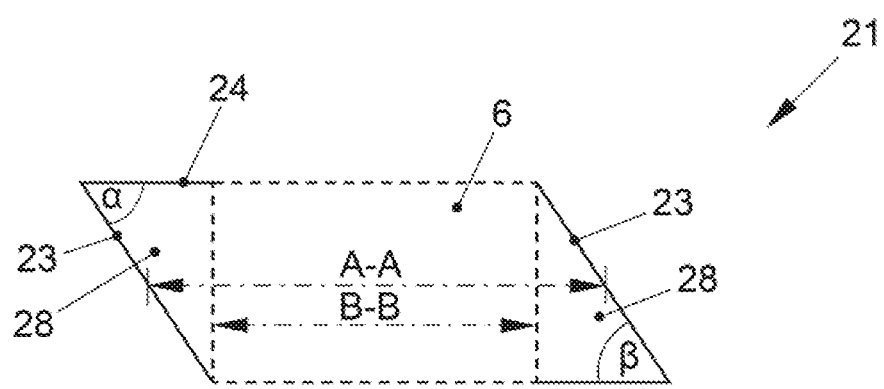
Figure 6A:
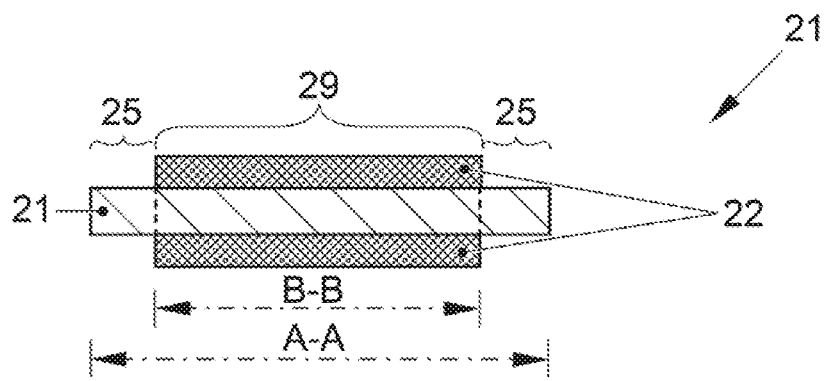
Figure 6B:
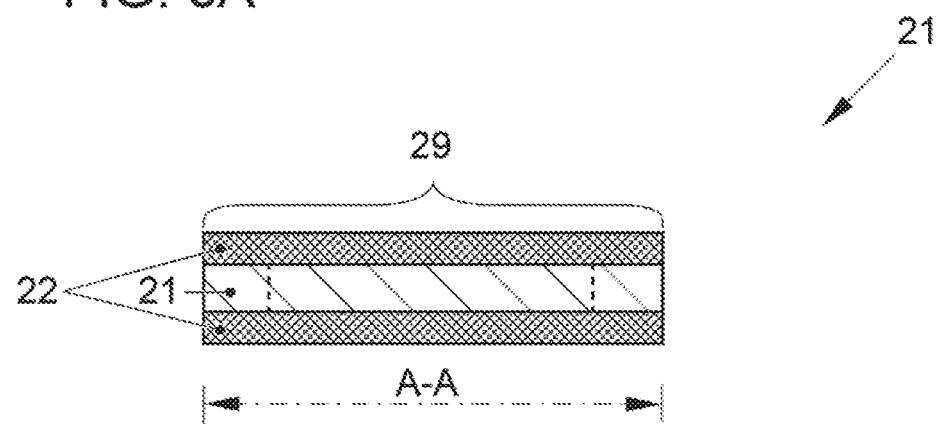

FIG. 4B a schematic representation of a membrane electrode assembly according to a preferred embodiment of the invention, FIG. 5 a schematic representation of a membrane according to a preferred embodiment of the invention, FIG. 6A a schematic representation of the cross-section of a membrane according to the prior art, and FIG. 6B a schematic representation of the cross-section of a membrane in the preferred embodiment of the invention.

FIG. 1 shows a fuel cell stack 100 in a schematic representation. Fuel cell stack 100 comprises a first end plate 111 as well as a second end plate 112. A plurality of stack elements stacked on top of one another is arranged between the end plates 111, 112, which comprise bipolar plates 113 and membrane electrode assemblies 114. The bipolar plates 113 are stacked alternately with the membrane electrode assemblies 114. The membrane electrode assemblies 114 each comprise a membrane and adjacent electrodes on both sides of the membrane, namely an anode and a cathode (not depicted). The membrane electrode assemblies 114 can also have gas diffusion layers (also not depicted) located on the membrane. Arranged between each of the bipolar plates 113 and membrane electrode assemblies 114 are respective sealing elements 115 that seal off the anode and cathode spaces gas-tight from the outside. The fuel cell stack 100 is pressed between the end plates 111 and 112 using clamping elements 116, for example tie rods or tensioning plates.

In FIG. 1, only the narrow sides of the bipolar plates 113 and the membrane electrode assemblies 114 are visible. The main faces of the bipolar plates 113 and the membrane electrode assemblies 114 are adjacent to one another. The representation in FIG. 1 is partially not dimensionally accurate. Typically, the thickness of an individual cell consisting of a bipolar plate 113 and a membrane electrode assembly 114 is a few mm, wherein the membrane electrode assembly 114 is by far the thinner component. In addition, the number of individual cells usually is much greater than shown.

FIG. 2 shows a schematic concept sketch of a section of a bipolar plate 1 in a first embodiment of the invention in a top view of the bipolar plate 1. Depicted is a distributor region 2 and the active region 6 of the bipolar plate 1 adjacent to it. The distributor region 2 is designed wider than the active region 6. It has three main operating media ports, namely one main cathode gas port 4, one main coolant port 5 and one main anode gas port 3. These are arranged in such a manner that the main cathode gas port 4 and the main coolant port 5 are positioned adjacent to each other along one side edge of the bipolar plate 1. In addition, the main cathode gas port 4 is arranged as an extension of the active region 6, meaning aligned with it. By contrast, the main anode gas port 3, which is adjacent to main coolant port 5, is situated out of alignment with the active region 6. Thus, the bipolar plate 1 in the depicted section has an L shape.

Starting from the main operating media ports 3, 4 and 5, flow channels 31, 41 and 51 lead into the active region 6 via the distributor region 2. At least two types of flow channels thus overlap in some regions. A first overlap section 9 and a second overlap section 10 are thus formed.

In the first overlap section 9, all flow channels 31, 41 and 51 overlap, wherein anode channels 31 and coolant channels 51 run essentially parallel to one another and overlap with cathode channels 41 at an angle in the range from 10° to 45°. The overlap of flow channels 31, 41 and 51 is executed in a non-fluid conveying manner, so that there is not a mixing or an exchange of operating media. In the depicted embodiment, the first overlap section 9 extends outward across a width that corresponds to the active region 6 and abuts a border line 12 on this. A further side edge 11 of the first overlap section 9 forms an extension of a longitudinal edge 13 of the active region 6. As a function of the shape of the main cathode port 4, the first overlap section 9 has the shape of a triangle, in particular a right triangle. The cathode channels 41 run straight across the distributor region 2 and transition directly into the cathode channels of the active region 6.

The second overlap section 10 is arranged laterally adjacent to the first overlap section 9 It is thus situated out of alignment with the active region 6. It is also preferably designed as a triangle and, with a side edge, in particular a hypotenuse, abuts the side edge 11 of the first overlap section 9 that forms the extension of the longitudinal edge 13 of the active region 6. The main anode gas port 3 and the main coolant port 5 adjoin the other sides of the second overlap region 10. The main coolant port 5 is thus preferably adjacent to the main cathode gas port 4 so that the coolant channels 51 extending from the main coolant port 5 meet at an angle to the cathode channels 41 on the first overlap section 9 and have essentially the same flow direction as said cathode channels 41. Furthermore, they run in a straight line over the second overlap section 10. By contrast, the anode flow channels 31 starting from the main anode port 3 meet at the first overlap section 9 at an angle greater than zero, so that they undergo a flow reversal after their straight run across the second overlap section 10 in order to run, in the first overlap section 9, essentially in the same direction as the cathode channels 41, relative to the flow direction of the anode gases.

In the depicted embodiment, the flow channels 31, 41 and 51 run parallel to each other and in a straight line in the active region 6. Alternatively, at least one type of flow channels 31, 41 and/or 51 can run in a meandering shape over the active region. The flow direction of the fluids in the flow channels 31, 41, and/or 51 is further preferably in the same direction, although embodiments can also be chosen in which two types, for example anode channels 31 and cathode channels 41, flow in opposition.

FIG. 3 depicts a schematic concept sketch of a section of a bipolar plate in a further embodiment of the invention. The section of the bipolar plate 1 is also shown in a top view and essentially corresponds to the design of the embodiment in FIG. 2. The difference between the second embodiment in comparison to that depicted in FIG. 2 is in the arrangement of the main anode gas port 3 and the main coolant port 5. These are switched compared to the first embodiment. This affects the arrangement and the flow direction of coolant channels 51 and anode channels 31. While the anode channels 31 on the border between the second and the first overlap sections 9, 10 undergo a flow reversal in the first embodiment, this applies to the coolant channels in the embodiment depicted in FIG. 3.

Conversely, the anode channels 31 here run straight over the entirety of distributor region 2.

Because cathode channels 41 and anode channels 31 overlap in the first overlap section 9, this region is already appropriate for the fuel cell reaction, because a fuel as well as an oxidant are available and can thus be designated as activatable region 28. In order to supply this fuel cell reaction, it is necessary that an appropriate electrode surface is available in this region. This can be realized via the provision of a membrane electrode assembly 20 as it is to be learned from the following figures.

FIG. 4A shows a membrane electrode assembly 20 according to the prior art in a top view of one of its side surfaces. The membrane electrode assembly 20 comprises the catalytically coated membrane 21. In the example shown, the catalytically coated membrane 21 has a hexagonal contour. An active region 6 that is indicated by a dashed line is arranged inside this hexagonal contour. Outside of the active region 6, the catalytically coated membrane 21 has activatable regions 28 and inactive regions 25. The active region 6 has the shape of the active region 6 of the bipolar plate 1. Depending upon if and how much of the activatable region has 28 a catalytic coating 22, the active region 6 and the activatable region 28 together form the activated region 29. The fuel cell reactionsat the anode and the cathode, and thus the generation of electricity, take place in this activated region 29 in the installed state of the membrane electrode assembly 20 in a fuel cell stack 100. By contrast, the inactive regions 25 serve for other functions, for example the supply of the operating media to the active region 6. Ideally, the polymer electrolyte membrane 21 is only coated with the catalytic coating 22 in the active region 6.

The membrane electrode assembly 20 comprises different passage openings 3 to 5 which are used for supply and discharge of the different operating media. These are preferably arranged in a protective and/or supportive layer 26 of the membrane. The first main anode gas port 3 thus serves to supply the anode operating gas to the anodes of the fuel cell stack 100, and an opposing second main anode gas port 3 serves to discharge the anode operating gas. In the same way, a first main cathode gas port 4 serves to supply a cathode operating gas to the cathodes of the fuel cell stack 100, and an opposing second main cathode gas port 4 serves to discharge the cathode operating gas. Finally, a first main coolant port 5 serves to supply a coolant to the internal coolant channels 51 of the bipolar plate 1, and an opposing second main coolant port 5 serves to discharge the coolant 52. The bipolar plates 1 (not shown in detail) have essentially the same cut as the depicted membrane electrode unit 20, in particular corresponding ports 3, 4, and 5. In this manner, in the stacked state of the membrane electrode assemblies 20 and bipolar plates 1, main operating media channels are formed that pass through the fuel cell stack 100 in its stack direction S (see FIG. 1). (These main operating media channels are not depicted in FIG. 1, which only shows a section through the active region 6 of the fuel cell stack.) The main anode and cathode gas ports 3 to 4 are connected in a fluid-conveying manner via open distributor channels of the adjoining bipolar plates 1 in the stack 100 to the corresponding anode or cathode channels 31, 41 of the bipolar plates 1. The main coolant ports 5 are connected to the internal coolant channels 51 of the bipolar plates 1. The ports 3, 4 and 5 and the distributor channel structures connecting anode or cathode channels 31, 41 of the active region 6 run in the inactive regions 25.

For mechanical support, the membrane 21 is generally bordered on both sides by a respective support layer 26, which surrounds the membrane 21 at its edge regions. The membrane 21 can also optionally extend over the entire surface of the membrane electrode assembly 20 and be laminated at its edge regions 26 with support layers. In FIG. 4A, seals 27 can also be recognized that border the operating media passage openings 3, 4 and 5, as well as the catalytically coated membrane 21, in order to seal these from the outside. Instead of being arranged on the membrane electrode unit 20, the seals 27 can optionally be arranged on the bipolar plates 1 or on both.

As was already stated, the fuel cell reaction takes place only in the activated region 29. An effort is therefore made to optimally apply the catalytic coatings 22 only in this region, because the catalytic material represents the most expensive single component of the fuel cell stack. On the other hand, an effort is made to design the active region 6 to be as large as possible and the inactive regions 25 to be as small as possible in order to achieve as high an energy output as possible, for example to minimize the required installation space and the weight of the fuel cell. Corresponding to this effort, contours of the activated region 29 result which can differ from the conventional rectangular contour (as shown in FIG. 4A) and can have an irregular contour.

The cost-efficient and time-saving mass production of catalytically coated membranes 21 with a non-rectangular active region has until now been only unsatisfactorily accomplished. For example, production can take place via selective coating methods in which the catalytic material is applied only to the activated region 6 of a membrane material, for example via selective printing methods such as screen printing or offset printing. These processes, however, are characterized by a slow production speed (print screening) or by cost-intensive machines (offset printing). On the other hand, continuous coating processes in which the catalytic material is applied with the creation of a constant coating width on the membrane material are quicker and more cost-efficient.

FIG. 4B shows a membrane electrode assembly 20' according to the invention. The basic structure of the membrane electrode assembly 20' according to the invention essentially corresponds to that depicted in FIG. 4A. The difference lies in the shape of the membrane 21 and of the electrodes. In this case, the membrane 21 has a quadrilateral shape having two parallel longitudinal sides. The short sides 23 are at an angle to the longitudinal sides 24 that deviates from 90°. In FIG. 4B, the membrane has the shape of a parallelogram.

The main operating media ports 3, 4 and 5 are arranged in the distributor region 2. The main cathode gas port 4 here is aligned as an extension of the active region 6. The main coolant port 5 and the main anode gas port 3 are arranged in the distributor region 2 lateral to the membrane 21.

FIG. 5 shows a schematic representation of a membrane 21 according to the preferred embodiment of the invention in FIG. 4B. The membrane 21 in top view has a quadrilateral shape, wherein the longitudinal sides 24 are arranged parallel to each other. The end points of the longitudinal sides 24 are each connected to one another via a short side 23. In this case, a first short side 23 with the two longitudinal sides 24 encloses an angle α, and the second short side 23 with the longitudinal sides 24 encloses an angle β. At least one of the two angles α and/or β deviates from 90°. In the embodiment shown, the angles α and β are also equally large. The two short sides 23 are therefore parallel to each other, and the membrane 21 thus has the shape of a parallelogram. The largest possible rectangle inside the membrane 21 which has the same width as the membrane 21 corresponds to the active region 6 of the bipolar plates 1 shown in previous Figures.

For arrangement in a membrane electrode assembly 20', a catalytic material 22 is arranged on the two sides of the membrane 21. This can be accomplished, for example, via catalytic coating of the membrane 21 or a gas diffusion layer (not shown). The catalytic coating 22 will be preformed in the active region 6 and, according to the invention, also in the activatable region 28, and therefore over the entire surface, with or without deactivation in some regions, or will be performed only in some regions. In this case, the goal is that all regions of the later membrane electrode assembly 20' have an active catalytic coating 22 in which fuel and oxidant are simultaneously present.

FIGS. 6A and 6B show the cross sections of a membrane 21 having adjoining catalytic coating 22 in two embodiments. The embodiment in FIG. 6A shows a partial catalytic coating 22 that only abuts the membrane in the active region 6. Inactive regions 25 are created that are not available for fuel cell reactions. In contrast to this, FIG. 6B shows in cross section a preferred embodiment of the membrane 21 according to the invention that has a catalytic coating 22 over the entire surface. The arrangement of this membrane 21 in a membrane electrode assembly 20 for a bipolar plate 1 of the type described in the FIGS. 2 and 3 increases the power density of the created fuel cell reaction because the regions in which the fuel cell reaction creates energy extend beyond the active region 6.

LIST OF REFERENCE SYMBOLS

1 Bipolar plate
2 Distributor region
3 Main anode gas port
4 Main cathode gas port
5 Main coolant gas port
6 Active region
7 Anode plate
8 Cathode plate
9 First overlap section
10 Second overlap section
11 Side edge of the first overlap section
12 Border line
13 Longitudinal edge of the active region
20 Membrane electrode assembly
20' Membrane electrode assembly according to the prior art
21 Membrane
22 Catalytic coating
23 Short side
24 Longitudinal side
25 Inactive region
26 Protective layer
27 Seal
28 Activatable region
29 Activated region
31 Anode channel
41 Cathode channel
51 Coolant channel
52 Coolant
100 Fuel cell stack
111 First end plate
112 Second end plate
113 Bipolar plate (Prior art)
114 Membrane electrode assembly
115 Sealing element
116 Clamping element
S Stack direction

The invention claimed is:

1. A bipolar plate for a fuel cell, the bipolar plate comprising:
a profiled anode plate and a profiled cathode plate, the bipolar plate having an active region and two distributor regions for supply and discharge of operating media to and from the active region, wherein the distributor regions each have:
one main anode gas port for supply or discharge of fuel;
one main cathode gas port for supply or discharge of oxidizing agent, which is arranged in such a manner that cathode channels extending therefrom run straight at least across the distributor region of the bipolar plate and have a flow direction that corresponds to a main flow direction in the cathode channels in the active region; and
one main coolant port for supply or discharge of coolant;
wherein the anode and cathode plates are formed and arranged atop each other in such a manner that the bipolar plate has channels for the operating media that connect the main operating media ports of the two distributor regions;

wherein the distributor regions have a first overlapping section in which cathode channels and anode channels overlap each other in a non-fluid communicating manner, and a second overlapping section in which anode channels and coolant channels overlap each other in a non-fluid communicating manner; and wherein the main coolant port and the main anode gas port are adjacent to one another, are collectively adjacent to the main cathode gas port, and are arranged out of alignment with the active region.

2. The bipolar plate according to claim 1, wherein the first overlapping section is arranged in an extension direction of the active region relative to its alignment.

3. The bipolar plate according to claim 1, wherein the first overlapping section has the shape of a triangle.

4. The bipolar plate according to claim 1, wherein the first overlapping section is arranged in such a manner that a first side edge of the first overlapping section runs as an extension of an edge of the active region.

5. The bipolar plate according to claim 1, wherein the first overlapping section is arranged in such a manner that a side edge of the first overlapping section runs with a border line of the active region perpendicular to its extension direction.

6. The bipolar plate according to claim 1, wherein the second overlapping section is arranged out of alignment with the active region.

7. The bipolar plate according to claim 1, wherein a flow direction of the anode gas runs in the anode channels in the second overlapping section in a direction facing away from the active region.

8. A method of fabricating a bipolar fuel cell plate having an active region and two distributor regions for supply and discharge of operating media to and from the active region, comprising:

forming a profiled anode plate and a profiled cathode plate and arranging the anode and cathode plates atop each other in such a manner that:

the distributor regions each have:

one main anode gas port for supply or discharge of fuel;

one main cathode gas port for supply or discharge of oxidizing agent, which is arranged in such a manner that cathode channels extending therefrom run straight at least across the distributor region of the bipolar plate and have a flow direction that corresponds to a main flow direction in the cathode channels in the active region; and one main coolant port for supply or discharge of coolant;

the bipolar plate has channels for the operating media that connect the main operating media ports of the two distributor regions;

the distributor regions have a first overlapping section in which cathode channels and anode channels overlap each other in a non-fluid communicating manner, and a second overlapping section in which anode channels and coolant channels overlap each other in a non-fluid communicating manner; and the main coolant port and the main anode gas port are adjacent to one another, are collectively adjacent to the main cathode gas port, and are arranged out of alignment with the active region.

9. The method of claim 8 wherein the anode and cathode plates are formed and arranged in such a manner that the first overlapping section is arranged in an extension direction of the active region relative to its alignment.

10. The method of claim 8 wherein the anode and cathode plates are formed and arranged in such a manner that the first overlapping section has the shape of a triangle.

11. The method of claim 8 wherein the anode and cathode plates are formed and arranged in such a manner that the first overlapping section is arranged in such a manner that a first side edge of the first overlapping section runs as an extension of an edge of the active region.

12. The method of claim 8 wherein the anode and cathode plates are formed and arranged in such a manner that the first overlapping section is arranged in such a manner that a side edge of the first overlapping section runs with a border line of the active region perpendicular to its extension direction.

13. The method of claim 8 wherein the anode and cathode plates are formed and arranged in such a manner that the second overlapping section is arranged out of alignment with the active region.

14. The method of claim 8 wherein the anode and cathode plates are formed and arranged in such a manner that a flow direction of the anode gas runs in the anode channels in the second overlapping section in a direction facing away from the active region.

\* \* \* \* \*